Figure 1:
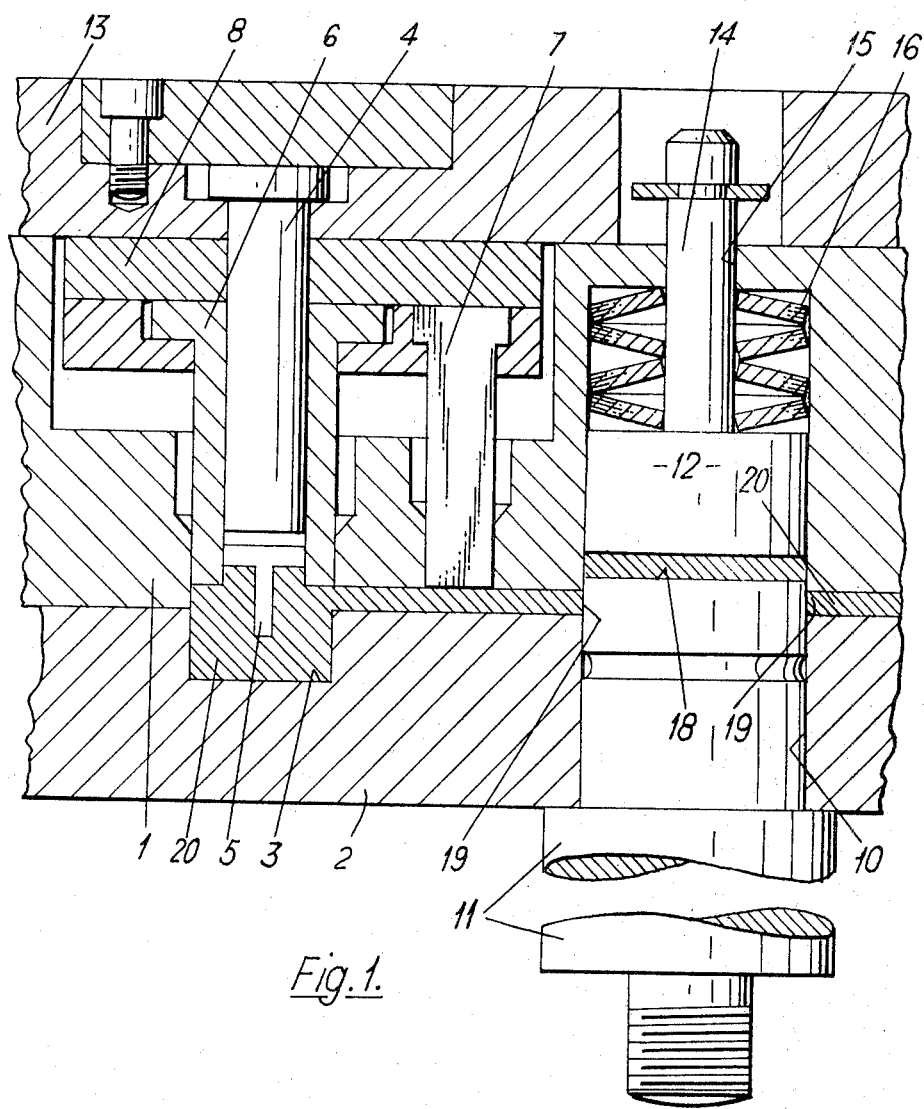

United States Patent [19]

Horley

[11] 3,836,303

[45] Sept. 17, 1974

[54] METHOD OF AND APPARATUS FOR THE MANUFACTURE OF MOULDINGS

[75] Inventor: Clifford William Horley, Harlington, England

[73] Assignee: General Motors Corporation, Detroit, Mich.

[22] Filed: Dec. 14, 1972

[21] Appl. No.: 315,092

[30] Foreign Application Priority Data
Dec. 22, 1971  Great Britain.................... 59574/71

[52] U.S. Cl.......... 425/214, 425/247, 425/DIG. 51, 425/DIG. 228
[51] Int. Cl.............................................. B29f 1/00
[58] Field of Search............ 425/DIG. 51, 247, 806, 425/146, 214

[56] References Cited
UNITED STATES PATENTS
2,923,031  2/1960  Collion.................. 425/DIG. 51 UX
2,992,455  7/1961  Salzman................. 425/DIG. 51 UX
3,695,572  10/1972  Darvin..................... 425/DIG. 51 X Primary Examiner—Milton S. Mehr
Attorney, Agent, or Firm—P. P. Kozak

[57] ABSTRACT

In a transfer moulding apparatus according to the invention the delivery under pressure of moulding material from a transfer chamber to a mould cavity is effected by means of a transfer ram which is movable into and out of the transfer chamber independently of the plunger or ram by which the mould die parts are opened and closed, and the moulding material is delivered from the transfer chamber to the mould cavity by way of a port which forms a common boundary between at least a part of an interior wall surface of the mould cavity and a part of an interior wall surface of the transfer chamber, said transfer ram, after the compression of the moulding material by the pressure applied by the transfer ram, being movable so as to occlude said port. Thus, the transfer ram may be moved upon the attainment of a predetermined pressure in the transfer chamber, or after a predetermined "dwell" of the transfer ram in its operative condition.

4 Claims, 2 Drawing Figures

METHOD OF AND APPARATUS FOR THE MANUFACTURE OF MOULDINGS

This invention relates to a method of and apparatus for the manufacture of mouldings, and more particularly to the manufacture of moulded articles of plastics materials by transfer moulding apparatus.

In a transfer moulding apparatus according to the invention the delivery under pressure of moulding material from a transfer chamber to a mould cavity is effected by means of a transfer ram which is movable into and out of the transfer chamber independently of the plunger or ram by which the mould die parts are opened and closed, and the moulding material is delivered from the transfer chamber to the mould cavity by way of a port which forms a common boundary between at least a part of an interior wall surface of the mould cavity and a part of an interior wall surface of the transfer chamber, said mould cavity and transfer ram, after the compression of the moulding material by the pressure applied by the transfer ram, being relatively movable so as to occlude said port. Thus, the die parts may be held in a fixed position and the transfer ram moved upon the attainment of a predetermined pressure in the transfer chamber, or after a predetermined "dwell" of the transfer ram in its operative condition.

The movement of the transfer ram at the predetermined pressure so as to occlude the port between the mould cavity and the transfer chamber may be a longitudinal movement of the transfer ram, or may be a rotary movement thereof, the end of the ram having a contour such that when rotated the contoured end effects occlusion of the port.

In a preferred arrangement one wall of the transfer chamber, other than that formed by the end of the transfer ram, is movable, but is restrained against movement until a predetermined pressure in the transfer chamber is reached, so as to effect a desired compression of the moulding material. This may be conveniently effected by making the transfer chamber a chamber in a cylinder in which a slave piston is movable from the end thereof opposite that in which the transfer ram is operative, the slave piston being restrained against movement, until the predetermined pressure in the transfer chamber is reached, by means of springs or other devices which yield to permit movement of the slave piston when the predetermined pressure in the transfer chamber is attained. Thus, the slave piston may have one or more springs interposed between the rear face thereof and the opposite end of the cylinder in which it is movable, the springs being of a strength such as to yield to allow movement of the slave piston when the predetermined pressure in the transfer chamber is attained; alternatively, the space behind the slave piston could be filled with fluid and the portion of the transfer chamber behind the slave piston be provided with a relief valve which opens to permit movement of the slave piston, and therefore movement of the transfer ram, when the predetermined pressure is reached in the transfer chamber.

As a further alternative, movement of the transfer ram could be initiated, as by means of the opening of a valve, after a predetermined "dwell" of the transfer ram, when operative, so as to ensure the attainment of a desirable compression of the moulding material and effective filling of the mould cavity.

Figure 2:
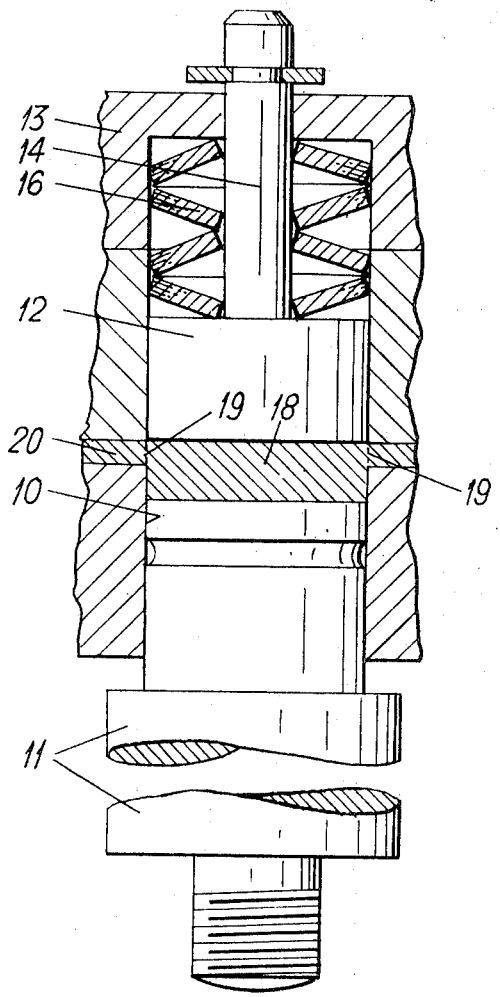

The scope of the invention is defined by the appended claims; and the invention and the method by which it is to be performed are hereinafter particularly described with reference to the accompanying drawings of a preferred embodiment of the invention in which:

FIG. 1 is a vertical section through part of a transfer moulding apparatus according to the invention, the parts being shown in the positions they occupy at the conclusion of a moulding operation; and FIG. 2 is a detail view of FIG. 1, showing parts of the apparatus prior to the conclusion of the moulding operation.

The drawings only show those parts of the apparatus which are essential for the understanding of the present invention, as the construction, arrangement and operation of the other parts of the moulding apparatus and their operation will be well known by those skilled in that art.

The transfer moulding apparatus shown in the drawings comprises upper and lower die parts 1, 2 respectively formed with appropriate recesses which, when the die is closed as shown in FIG. 1, provide between them a mould cavity 3. The upper die part 1 is secured to a carrier plate 13 adapted to be raised or lowered in known manner by means of a press (not shown). The die parts shown are those for the moulding of a speedometer needle, and the upper die part 1 includes a core member 4 which is secured in the plate 13 and has at its lower end a projecting pin 5 to form a recess in a boss portion of the needle. Mounted around the core 4 is a sleeve ejector member 6, and overlying the pointer portion of the die recess for the moulded speedometer needle is a blade ejector 7, the sleeve ejector 6 and blade ejector 7 being secured on an ejector plate 8 which is adapted to be moved downwards from the position shown in FIG. 1 to effect the ejection of the moulded article from the die cavity 3 when the upper die part 1 is raised from the lower die part 2 after the conclusion of the moulding operation. The ejector plate 8 may be actuated in known manner, as by hydraulically or mechanically operated means, (not shown).

The die parts 1, 2 are each formed with aligned bores therein which, when the die parts are in the closed position form a cylindrical cavity 10 which is in direct communication with the mould cavity 3, and in the lower portion of which a transfer ram 11 is adapted to be reciprocated by hydraulic or other means (not shown). Mounted for reciprocation in the upper part of the cylindrical cavity 10 is a slave piston 12 fixed on the end of a piston rod 14 which is slidable in a bore 15 in the upper part of the die member 1. Interposed between the rear face of the slave piston 12 and the upper end of the cylindrical cavity 10 is a plurality of Belleville springs 16.

The space between the slave piston 12 and the upper end of the transfer ram 11 constitutes a transfer chamber 18 which, in the condition of the apparatus shown in FIG. 2, is in direct communication with the mould cavity 3 by way of a port 19 in the wall of the cavity 10.

The springs 16, in their least stressed condition, maintain the slave piston 12 in a position such that the end thereof facing the end of the transfer ram 11 is adjacent but does not overlie the part of the mould cavity 3 which opens directly into the transfer chamber 18 by way of the port 19.

As indicated in FIGS. 1 and 2, there may be one or more additional ports 19 in the wall of the transfer chamber 18, in communication with one or more additional mould cavities 3 formed in the die parts 1, 2 around the transfer chamber 18.

The transfer ram 11 is formed with a contour such that the portion thereof aligned with the port 19 will be complementary to that portion of the wall of the mould cavity 3 which is omitted to form the port 19 and which is occupied by the aligned portion of the transfer ram surface when the port 19 is occluded during the final movement of the transfer ram 11, as hereinafter described. Thus, although in the embodiment described herein the transfer chamber 18 is part of a cylindrical bore 10 in which the ram 11 is slidable, the bore could be of other tubular form.

OPERATION

In operation, a measured quantity of moulding material, for example a dough moulding compound, is placed in the transfer chamber 18, the die parts 1, 2 being in the open position. The two halves of the die are then closed by operation of a press in known manner and the transfer ram is then advanced upwardly, as viewed in the drawing, so as to reduce the volume of the transfer chamber 18 and thereby compress the moulding material and force it into the mould cavity 3 under pressure. When the pressure in the mould cavity and transfer chamber reaches a predetermined value, at a point in the travel of the transfer ram 11 before the end of the latter overlies any part of the port 19 between the mould cavity 3 and transfer chamber 18, the pressure on the slave piston 12 overcomes the resistance of the Belleville springs 16 and the slave piston then moves upwardly in the cavity 10, the consequent reduction in the resistance to movement of the transfer ram 11 permitting the latter to advance further into the transfer chamber 18 until a portion of the side face of the transfer ram 11 overlies and occludes the port 19 between the mould cavity 3 and transfer chamber 18 which forms the common boundary therebetween.

The moulding material is then allowed or caused to set, whereafter the die parts 1, 2 are separated and the ejector plate 8 is actuated so as to move the ejector sleeve and ejector blade 6, 7 downwardly to eject the moulded article from the dies.

The so-called "biscuit" of residual moulding material in the transfer chamber 18 is then removed before the introduction of a fresh charge of moulding material for a further moulding operation.

With the construction described the moulded article is formed without any runner or sprues which interconnects the moulded article and the waste moulding material or so-called "biscuit" in the transfer chamber which is normally ejected after each moulding operation. The movement of the transfer ram, when the predetermined pressure is reached in the transfer chamber, displaces the portion of the moulding material in the transfer chamber which was previously connected to that in the mould chamber; and the port which forms the common boundary between a part of the mould chamber wall and a part of the transfer chamber wall is closed by a portion of the side wall of the transfer ram which thus acts as a part of the wall of the mould chamber.

The transfer moulding apparatus according to the invention and the method of making moulded articles in accordance therewith ensures that the components are moulded as complete parts without runners or sprue and do not therefore require subsequent trimming, apart from the removal of flash when this is present.

If, as is customary, a number of parts are moulded during each operation of the moulding apparatus, by connection of a number of mould cavities with a single transfer chamber, a number of parts of different shapes and dimensions can be moulded separately from each other and can thereafter be separately discharged from the moulding apparatus and collected, if desired in separate containers for subsequent assembly. In this way it is possible to avoid the operations of separating a number of different parts from a common sprue or runner. The formation of the parts without a connecting sprue or runner also ensures that the parts have a better appearance which in many cases will be superior to that which could be obtained when the parts are then separately trimmed.

As hereinbefore indicated, the movement of the transfer ram to occlude the port 19 between the transfer chamber 18 and the mould cavity 3 could, alternatively, be controlled by an hydraulic pressure system, the movement of the slave piston 12 being effected by pressure responsive valves in an hydraulic circuit or by means of time controlled valves which ensure a desired dwell period in which the moulding material is maintained under pressure before movement of the transfer ram to occlude the port 19 is initiated.

Similarly, as an alternative to longitudinal movement of the transfer ram, the end face thereof could be contoured so that rotation of the transfer ram would effect occlusion of the transfer port 19.

I claim:

1. A transfer moulding apparatus including a mould comprising a pair of die members; means for moving said die members between an open position and a position in which they are closed against each other to form a mould cavity therebetween; a tubular recess extending into said mould from an external face thereof; a transfer ram mounted for reciprocation in said recess from one end thereof; a slave piston slidable in said recess from the other end thereof, the space between said ram and said piston constituting a transfer chamber and said transfer chamber and said mould cavity being in direct communication with each other by way of a port which forms a common boundary between at least a part of an interior wall surface of said mould cavity and a part of an interior wall surface of said transfer chamber; pressure means operable on said transfer ram after the closure of said die members and the insertion of a charge of moulding material into said transfer chamber so as to compress said material and force it under pressure into said mould cavity by way of said port; and means operable on said slave piston in opposition to the pressure in said transfer chamber so as to prevent movement of said transfer ram to a position in said recess in which it overlies and occludes said port until said mould chamber has been filled with said mould material under the pressure from said transfer chamber, but thereafter to effect such movement.

2. A transfer moulding apparatus as claimed in claim 1, in which spring means are interposed between the other end of said recess and said slave piston, said springs being such as to resist movement of said transfer ram to said position until a predetermined pressure is attained in said transfer chamber but thereafter to yield and permit such movement.

3. A transfer moulding apparatus as claimed in claim 2, in which said spring means comprises a plurality of Belleville springs interposed between said other end of the recess and said slave piston.

4. In a transfer moulding apparatus in which the delivery under pressure of moulding material from a transfer chamber to a mould cavity formed by the closure of movable die members is effected by a transfer ram which is movable into and out of the transfer chamber, the improvement comprising means for effecting such movement of the transfer ram independently of the means by which the mould die members are opened and closed, said moulding material being delivered from the transfer chamber to the mould cavity by way of a port which forms a common boundary between at least a part of an interior wall surface of the mould cavity and a part of an interior wall surface of the transfer chamber, and means operable on said transfer ram which permits said transfer ram to move after the compression of the moulding material by the pressure applied by the transfer ram, so as to occlude said port.

* * * * *